United States Patent [19]
Matsubayashi et al.

[11] 3,860,220
[45] Jan. 14, 1975

[54] MULTI-SECTION SCREW EXTRUDER

[75] Inventors: Saburo Matsubayashi, Aichi-ken; Kaoru Takano, Nagoya, both of Japan

[73] Assignee: Mitsubishi Jukogyo Kabushiki Kaisha, Tokyo, Japan

[22] Filed: Jan. 29, 1973

[21] Appl. No.: 327,482

[30] Foreign Application Priority Data
Jan. 28, 1972  Japan.............................. 47-10309

[52] U.S. Cl.................................. 259/192, 259/193
[51] Int. Cl................................................. B29b 1/04
[58] Field of Search......... 259/191, 192, 193, 6, 21, 259/41, 5, 40, 64, 65, 68, 69

[56] References Cited
UNITED STATES PATENTS

| | | | |
|---|---|---|---|
| 2,213,381 | 9/1940 | Brown..................... | 259/6 |
| 3,261,056 | 7/1966 | Fritsch..................... | 259/192 |
| 3,431,599 | 3/1969 | Fogelberg................. | 259/191 |
| 3,733,059 | 5/1973 | Pettit....................... | 259/191 |

*Primary Examiner*—Robert W. Jenkins
*Attorney, Agent, or Firm*—McGlew and Tuttle

[57] ABSTRACT

A large-capacity screw extruder for non-expandable resins comprises a first extruder cylinder of relatively small diameter having an inlet adjacent one end and a discharge adjacent the opposite end which discharges through a fluid pressure-tight connection to a second extruder cylinder of relatively large diameter having an extruder screw of relatively large diameter which rotates at a speed which is at most half the speed of the smaller diameter screw. The connection between the sections of the extruder is provided with an exchangeable screen changer and means are provided for sensing the pressure in the connection and for regulating the speed of the drive of the small diameter extruder screw in order to maintain selected pressure conditions. In one embodiment, the larger diameter extruder cylinder is provided with an intermediate vent to permit the venting off of gases. Both extruder cylinders are advantageously provided with means for selectively heating and cooling the cylinders during operation. With the method of the invention, unexpandable resin material is fed into the inlet hopper of the first extruder cylinder and is operated at a relatively high rotational speed to effect the melting of the resin at a very high rate by the rotation of the screw and by the addition of heat as necessary. The resin is delivered through the discharge of the first cylinder and the connection between the first and second cylinders into the second cylinder where the screw therein is rotated at a relatively low rate which is at most one half the rotational speed of the first section. The pressure between the two sections is advantageously monitored during the operation and controlled at a selected amount and the resin being treated in the second section is advantageously cooled and may also be vented.

11 Claims, 2 Drawing Figures

MULTI-SECTION SCREW EXTRUDER

BACKGROUND OF THE INVENTION

1. Field of the Invention

This invention relates, in general, to the construction of screw extruders and, in particular, to a new and useful screw extruder which includes two interconnected sections each with an extruder screw and with one of them including a relatively smaller diameter extruder screw which is rotated at a speed which is at least twice the speed of the larger diameter second section and to a method of extruding resin wherein the resin is delivered first into an extruder cylinder which is rotated at relatively high speed and it is melted at a relatively high rate and is then delivered into a second portion of the extruder where the extruder screw is rotated at a relatively low rate and where the material is advantageously regulated in temperature, such as by cooling.

2. Description of the Prior Art

Conventional single screw extruders for extruding unexpandable synthetic resins usually have a single rotatable extruder screw for the feeding, melting, mixing and metering of the material and for the subsequent extrusion of the material through a die. If the screw speed is increased, in order to obtain a larger rate of production, the retention time of the material in the screw is shortened and this often leads to trouble such as inadequate mixing and non-uniform temperature distribution. In addition, high shearing forces which are exerted by the screw tends to cause the development of an excessive internal heat which raises the resin temperature even above its critical level. A further undesirable characteristic is a tendency for surging of output rate due to uneven biting of the material by the screw at the feed portion. For these reasons, single screw extruders are operated at speed ranges which yield relatively low productivity.

Single screw extruders are usually equipped with a screen changer or the like at the front or discharge end, but the replacement of these screens requires a downtime in which the flow of the extrusion has to be interrupted. This means an additional labor cost and material loss.

At the present time, the demand is for extruders which can operate at larger output capacities and which have a higher performance than the known extruders. If such requirements are met by a single screw extruder, the screw diameter must be increased because the screw speed cannot be raised for the reasons mentioned above. This, combined with the tendency for a higher length to diameter ratio for effecting a good quality of the product, might necessitate such large extruder as would be beyond the limits of manufacturing capacity, cost and maintenance. Therefore, there is a definite requirement for extruders of novel designs to extend such limits. Moreover the requirement for a machine that can directly extrude products from powder in a manner which will reduce the production costs is increasing

SUMMARY OF THE INVENTION

The present invention is an improvement over the prior art by providing an extruder which includes two separate sections with the first section having an inlet for the material which comprises a small diameter screw which is driven at a relatively high speed and which delivers the melted resin through a connection to the second section which has a relatively large diameter extruder screw which operates at a slower speed. The connection between the two sections is provided with a removable screen section which may be removed to clean out any trapped impurities and which may be replaced with the same or a different size screen. With the method of the invention, it is possible to feed unexpandable material into the inlet hopper of the first section and to rotate the extruder screw in the first section at a rapid speed so that the product is melted by the frictional heat of the extruder screw and by an additional heater, if necessary, and is then delivered to the second section where the extruder screw which is larger, is rotated at a slower speed. The impurities in the material which are treated from the first section are removed by an exchangeable screen located in a connection between the two sections. The second section is advantageously operated with a cooling device for maintaining the resin material at an acceptable temperature, and it is also possible with the device of the invention and with the inventive method to vent the gases from the material preferably intermediate the length of the second section. The screw speed of the first section is advantageously controlled in accordance with a pressure of the resin material which is sensed in the connection between the two sections.

Accordingly, it is an object of the invention to provide an improved extruder device which includes two interconnected sections with one of them having a smaller diameter extruder screw which is rotated at a relatively high rate of speed, for example, at least two times the speed of the second section extruder screw in order to deliver the resin material at a high rate into the second section.

A further object of the invention is to provide a method of treating a non-expandable resin using an extruder having two sections which comprises operating the first section at a relatively high speed in order to rapidly heat the resin material and delivering the melted material into the second section where the extruder is operated at a lower speed.

A further object of the invention is to provide an extruder which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
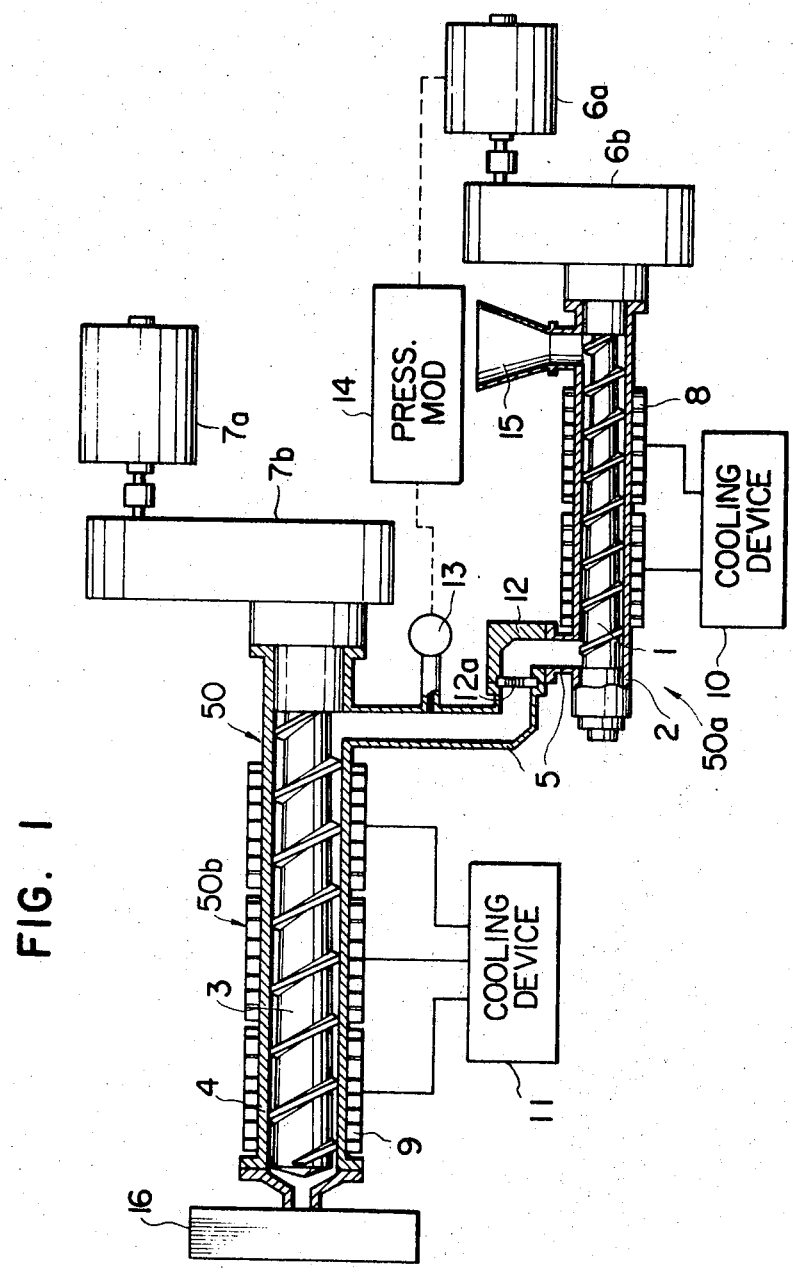
FIG. 1 is a schematic view, partly in section of a large capacity two-screw extruder constructed in accordance with the invention.

Referring to the drawings, in particular, the invention embodied therein comprises an extruder generally designated 50 for extruding non-expandable resins and which includes a first section generally designated 50a which is connected to a second section generally designated 50b through a connecting tube 5. The first section 50a includes a first extruding screw 1 of relatively small diameter which operates in a small diameter first cylinder 2. The cylinder 2 has an inlet at one end connected to a hopper 15 for the infeed of the resin material in powdered form, for example. The screw 1 is operated by a high-speed drive generally designated 6, which includes a drive motor 6a and a reduction gear 6b. The cylinder 2 is advantageously heated by a heater 8 or it may be cooled, if desired, by a cooling device 10.

The second section 50b includes a second cylinder 4 of relatively large diameter having a second screw 3 rotatable therein and driven by drive means generally designated 7 which includes a drive motor 7a and reduction gearing 7b which are operated so as to rotate the second large diameter screw 3 at less than half the speed of the small diameter screw 1. The second section 50b includes a heater 9 and it also includes a cooling device 11 so that the temperature of the material passing through the cylinder 4 may be controlled.

The connecting tube 5 is advantageously provided with a screen exchanger 12 with a screen 12a which may be removed in order to permit cleaning of the screen 12a and replacement thereof or replacement by a screen of a different size, as desired. In addition, a pressure sensing device 13 is connected to a pressure control pressure modulator 14 which, in turn, is connected to the drive motor 6a of the drive 6 in order to regulate the speed of the rotation of the screw 1 in accordance with the pressure sensed in the connection 5 downstream of the discharge of the cylinder 2 into the connecting tube 5. The pressure control 14 compares the detected pressure with the preset pressure and, whenever there is any deviation, causes the first screw 1 to be rotated at a rotational speed which will correct the pressure variation in order that the resin pressure at the detecting point is kept constant, if desired.

The unexpandable synthetic resin material is fed from the hopper 15 into the first extruding section where it is melted and blended and finally extruded from the discharge end of the second section 50b through a die 16 which is attached to the front end of the second extruding section. The die 16 is of a configuration to form the material into the desired shape.

Figure 2:
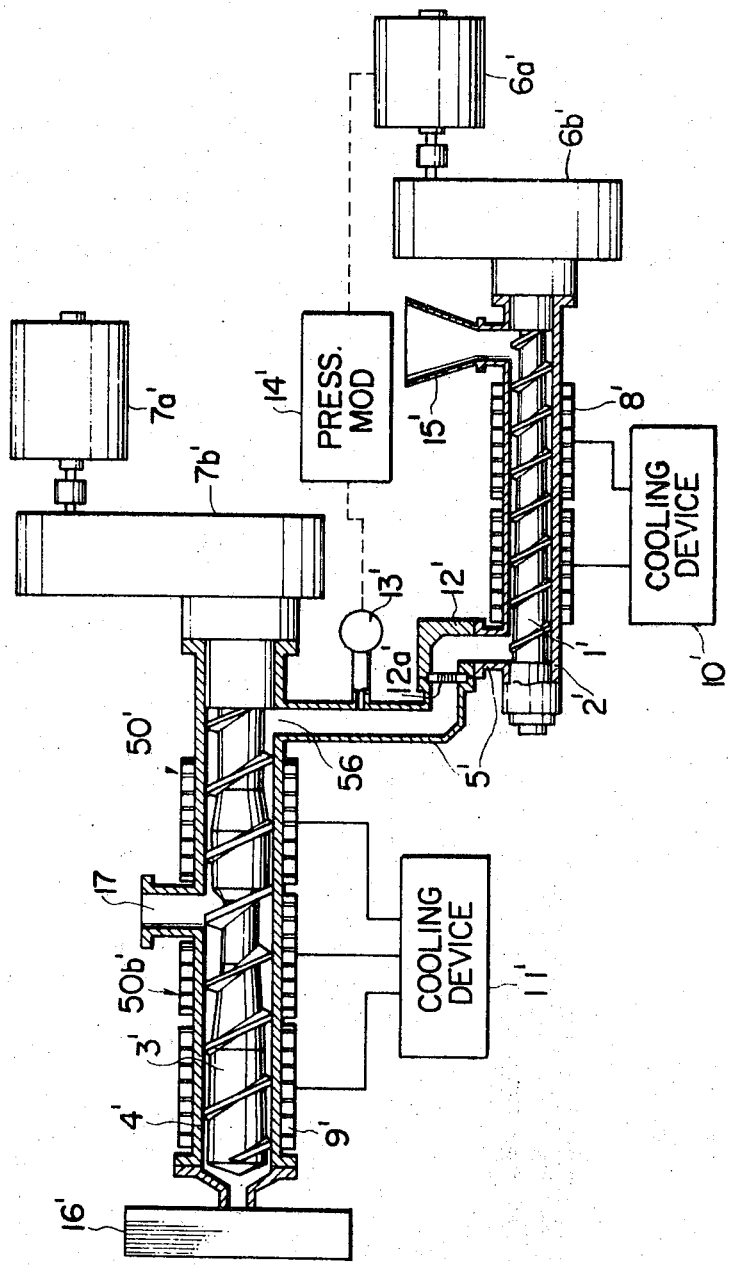
FIG. 2 is a view, similar to FIG. 2, of another embodiment of the invention.

In the embodiment shown in FIG. 2, there is provided an extruder generally designated 50' which includes parts which are similar to that shown in FIG. 1 and which are similarly designated, but with the addition of a prime after each part number. In this construction, however, the second section cylinder 4' is provided with a vent 17 located between its inlet 56 and its discharge to the die 16'. The vent 17 may be located intermediate the length of the cylinder 4' as shown, or, more close to the inlet 56 if desired. This will depend on the type of material which is employed and, in any case, it provides means for releasing volatile matter and gases from the melt into the atmosphere.

In accordance with the method of the invention, unexpanded material is fed from the hopper 15 into the first extruding section, and it is melted therein by heat from the rotation of the screw 1' at relatively high speed and also by heat supplied by the external heaters 8 or 8'. The material which is delivered at high rate from the discharge of the cylinder 2 or 2' is delivered into the connecting tube 5 or 5' and it is filtered by passing through the screen 12a or 12a'. The melt enters the inlet 56 of the second section 50b or 50b', and it is moved at a relatively lower speed by the rotation of the extruder screws 3 or 3' toward the discharge end and through the die 16 or 16'. With the lower speed of rotation, the temperature of the material does not rise to any great extent and it is maintained at the desired lower temperature by operating the cooling device 11 or 11'. In the vent type of extruder shown in FIG. 2, the gases which develop during the extrusion of the material are vented in the second section and they pass off through the vent 17 shown in FIG. 2 to the atmosphere.

In the second extruding section, the irregularities of temperature distribution and blending of the resin which has been melted at high speed in the first section are corrected and the extrusion variation of the first section is lessened. Control of the screw speed in the first extruding section on the basis of pressure which is detected in the connecting tube 5 or 5' makes it possible to stabilize the entire extruding operation. The extruder screw 1 or 1' is driven at a speed in dependence on a pressure detected in the connecting tube 5 or 5'.

The following are examples of operation using the extruder device and method of the invention:

EXAMPLE 1

An extruder as shown in FIG. 1 was used. In the first extruding section, the cylinder bore was 65 mm, L/D was 14, and the maximum screw speed was 1,000 r.p.m. The screw employed was one (dulmadge type, barrier type or the like) provided with special mixing means capable of exerting high shearing force on synthetic resin material. In the second extruding section, the cylinder bore was 90 mm, L/D was 17, and the maximum screw speed was 200 r.p.m. The screw was of full-flight normal type. The connecting tube was provided with a screen changer and a pressure detector. Also a pressure converter was installed which could automatically control the screw speed of the first extruding section to maintain a constant pressure inside the connecting tube. Both the first and second extruding sections were electrically heated and water cooled. A T-die was attached to the front end of the second extruding section. The result of extrusion from polypropylene pellet of biaxial stretching film grade ($MI = 1.6 \sim 1.8$) was as follows.

| First extruding section | : | Cylinder bore 65 mm Screw speed 800 r.p.m. |
| Second extruding section | : | Cylinder bore 90 mm Screw speed 200 r.p.m. |
| Extrusion rate | : | 400 kg/H |

The variation in the extrusion rate was less than ± 1 percent and the temperature of the resin emerging from the T-die was 275°C. Good product was obtained which exhibited a good mixing effect and bubble-free quality.

For the comparison purpose, a conventional extruder of the following specification was used to extrude the same resin (polypropylene pellets) as employed above.

| | | |
|---|---|---|
| Cylinder bore | : | 90 mm |
| Screw speed | : | 100 r.p.m. |
| Extrusion rate | : | 129 kg/H |

The temperature of the resin emerging from the T-die was 280°C, and both mixing and devolatizing effect achieved were satisfactory. Using the same machine the same material was extruded at an increased screw speed of 150 r.p.m. and hence at a higher extrusion rate of 194 kg/H. The mixing and devolatizing effects attained were acceptable, but the resin temperature outside of the T-die was 291°C in excess of the critical temperature for sheet forming and the result was not satisfactory. Higher screw speeds caused such insufficient mixing and serious inclusion of air bubbles that the products were of no use.

EXAMPLE 2

An extruder as shown in FIG. 2 was used. Following was the result for polypropylene (MI = 1.3) extrusion by powder feed.

| | | |
|---|---|---|
| First extrusion section | : | Cylinder bore 65 mm screw speed 885 r.p.m. |
| Second extruding section | : | Cylinder bore 90 mm Screw speed 153 r.p.m. |
| Extrusion rate | : | 344 kg/H |

The variation in the extrusion rate was less than ± 1 percent, and the temperature of the resin emerging from the T-die was 259°C. A good mixing effect was attained. The second extruding section was vent type, and vacuum suction through the vent made it possible to obtain a bubble-free product.

For the comparison purpose, a conventional single-screw extruder and the same resin (polypropylene powder) were used for direct extrusion into a sheet form. The attempt failed because of insufficient mixing, inclusion of bubbles, and variation in the extrusion rate.

EXAMPLE 3

Using the extruder of FIG. 2, polystyrene of biaxial stretching film grade in pellet form was extruded.

| | | |
|---|---|---|
| First extruding section | : | Cylinder bore 65 mm Screw speed 715 r.p.m. |
| Second extruding section | : | Cylinder bore 90 mm Screw speed 198 r.p.m. |
| Extrusion rate | : | 400 kg/H |

The variation in the extrusion rate was less than ± 1 percent, and the temperature of the resin emerging from the T-die was 240°C. A satisfactory mixing effect was attained. When the second extruding section of vent type was employed and the melt was degassed by vacuum suction through the vent, bubbles and residual monomer were removed very satisfactorily.

Although the extruders used in the foregoing examples were such that the cylinder bore of the first extruding section was 65 mm and that of the second extruding section was 90 mm, various other combinations of cylinder bores may be used including, for example, 90 mm – 115 mm, 115 mm – 150 mm, 150 mm – 200 mm, 200 mm – 250 mm, and 200 mm – 300 mm. A suitable combination may be employed depending upon the type of synthetic resin to be handled, the type of article desired, the predetermined rate of extrusion, etc.

As described in detail hereinbefore, the present invention provides an extruder comprising first and second extruding sections, the first one being designed primarily for the melting of synthetic resin to be fed to the second section. Therefore, the first screw may take an efficient shape solely for a high melting performance, and can run at an unusually high speed. This, in turn, renders it possible to design and construct an extruder small in size and yet having a large production capacity. The rise of the resin temperature, ununiform temperature distribution, uneven kneading, variation in delivery, and other shortcomings of the high-speed running of the first screw are largely corrected by guiding the melt through the second extruding section where the cylinder bore is larger, the screw speed is lower, and the cooling capacity is higher than in the first extruding section. Thus, in the second extruding section, the retention time of the resin is longer, the cooling area of the cylinder is larger, and the metering function is improved because the molten resin alone is extruded, with the result that the resin is uniformly cooled and mixed to give an extrusion of uniform quality. Since the pressure inside the communication passage between the two extruding sections can be controlled, the extrusion all the more stabilized and articles of such good quality that are not easily obtained with conventional extruders are formed in larger quantities than heretofore. Further, the provision of a screen changer in the connecting part between the two extruding sections permits the screen to be replaced without interrupting the extrusion forming although the delivery from the second extruding section is decreased for a moment due to the temporary cut-off of the resin flow through the screen. There is no loss of product due to the lack of material emerging through the die as in a conventional extruder.

According to the present invention, therefore, the L/D's of the first and second extruding sections can be decreased and even a large extruder can be manufactured with ease and at low cost. Moreover, by suitably choosing and balancing the screw speeds of the two extruding sections, it is possible to have every synthetic resin extruded by the same combination of screws, thus making the extruder really versatile in use.

While specific embodiments of the invention have been shown and described in detail to illustrate the application of the inventive principles, it will be understood that the invention may be embodied otherwise without departing from such principles.

What is claimed is:

1. A large capacity screw extruder for non-expandable resins, comprising a first extruder section including a first extruder cylinder of relatively small diameter having an inlet adjacent one end and a discharge adjacent the opposite end, a first extruder screw rotatable in said first extruder cylinder at a relatively high rate of speed for melting the resin material an moving the material from the inlet to the discharge, a second extruder section having a second extruder cylinder of relatively large diameter and having an inlet adjacent one end and a discharge adjacent the opposite end, a second extruder screw rotatable in said second extruder cylinder at a relatively low rate of speed to permit retention of the resin material in said second extruder cylinder and slower movement thereof from said inlet to said discharge, and drive means connected to said first extruder screw and said second extruder screw for driving said first and second extruder screws at distinct speeds with said first extruder screw being rotatable at at least twice the speed of said second extruder screw, a connection between the discharge of said first extruder cylinder and the inlet of said second extruder cylinder for delivering the material advanced through said first extruder cylinder to said second extruder cylinder and pressure responsive sensing means connected to said connection and said drive means for regulating said drive means in accordance with the pressure in said connection.

2. A large capacity screw extruder according to claim 1, including means associated with at least one of said extruder sections for regulating the temperature of the material delivered therethrough.

3. A device, according to claim 2, including means associated with said second extruder section for selectively heating and cooling the material being moved through said second extruder cylinder.

4. A large capacity screw extruder according to claim 1, including cooling means connected to said second extruder cylinder for cooling the material being moved therethrough.

5. An extruder according to claim 1, including means associated with each of said first and second cylinders for selectively heating and cooling said first and second cylinders for controlling the temperature of the material being moved therethrough.

6. A large capacity screw extruder, according to claim 1, including vent means associated with said second cylinder for venting.

7. A large capacity screw extruder for non-expandable resin comprising a first extruder section including a small diameter cylinder having an inlet adjacent one end and a discharge adjacent the opposite end, a first extruder screw of a small diameter rotatable in said first extruder cylinder for moving material received through said inlet to the discharge, a second extruder section having a second extruder cylinder of a larger diameter than said first extruder cylinder and having an inlet and a discharge spaced from said inlet, a second extruder screw of a larger diameter than said first extruder screw rotatable in said second extruder cylinder, a first drive motor connected to said first extruder screw for rotating said extruder screw at a high speed, a second drive motor connected to said second extruder screw for rotating said second extruder screw at a lower speed than said first extruder screw, said first extruder screw being rotated at a speed which is at least twice the speed of said second extruder screw, and a connection pipe definining an elongated pressure chamber extending between the inlet of said second extruder cylinder and a discharge of said first extruder cylinder for the passage of the resin material from said first extruder cylinder to said second extruder cylinder.

8. A large capacity screw extruder according to claim 7, including a removable screen in said connection.

9. A large capacity screw extruder for non-expandable resins, comprising a first extruder section including a first extruder cylinder of relatively small diameter having an inlet adjacent one end and a discharge adjacent the opposite end, a first extruder screw rotatable in said first extruder cylinder at a relatively high rate of speed for melting the resin material and moving the material from the inlet to the discharge, a second extruder section having a second extruder cylinder of relatively large diameter and having an inlet adjacent one end and a discharge adjacent the opposite end, a second extruder screw rotatable in said second extruder cylinder at a relatively low rate of speed to permit retention of the resin material in said second extruder cylinder and slower movement thereof from said inlet to said discharge, and drive means connected to said first extruder screw and said second extruder screw for driving said first and second extruder screws at distinct speeds with said first extruder screw being rotatable at at least twice the speed of said second extruder screw, and a connection between the discharge of said first extruder cylinder and the inlet of said second extruder cylinder for delivering the material advanced through said first extruder cylinder to said second extruder cylinder, said drive means comprising a separate drive motor for each of said first and second extruder screws, means for sensing the pressure of the material passing through the connection between the discharge of said first cylinder and the inlet of said second cylinder and being connected to the drive for said first extruder screw for varying the speed of rotation of said first extruder screw in accordance with the pressure sensed.

10. A large capacity screw extruder for non-expandable resin comprising a first extruder section including a small diameter cylinder having an inlet adjacent one end and a discharge adjacent the opposite end, a first extruder screw of a small diameter rotatable in said first extruder cylinder for moving material received through said inlet to the discharge, a second extruder section having a second extruder cylinder of a larger diameter than said first extruder cylinder and having an inlet and a dischargepaced from said inlet, a second extruder screw of a larger diameter than said first extruder screw rotatable in said second extruder cylinder, a first drive motor connected to said first extruder screw for rotating said extruder screw at a high speed, a second drive motor connected to said second extruder screw for rotating said second extruder screw at a lower speed than said first extruder screw, said first extruder screw being rotated at a speed which is at least twice the speed of said second extruder screw, and a connection pipe defining an elongated pressure chamber extending between the inlet of said second extruder cylinder and a discharge of said first extruder cylinder for the passage of the resin material from said first extruder cylinder to said second extruder cylinder, a removable screen in said connection, and means for sensing the pressure in said connection which is connected to said first drive motor for driving said drive motor at a speed regulated in accordance with the pressure which is sensed.

11. A large capacity screw extruder according to claim 10, including heating and cooling means associated with each of said cylinders for selectively heating and cooling the material therein.

* * * * *